(12) United States Patent
Kerschgens et al.

(10) Patent No.: US 9,187,341 B2
(45) Date of Patent: Nov. 17, 2015

(54) SOLAR THERMAL DEVICE FOR PRODUCING FRESH WATER

(75) Inventors: Daniel Kerschgens, Javea (ES); Norbert Sustr, Vienna (AT); Karl Albrecht Waldstein-Wartenberg, Vienna (AT); Franz Grabler-Fritz, Vienna (AT)

(73) Assignee: 4ELEMENTS INVENT LTD, Swatar, Birkirkara, Malta (MA)

( * ) Notice: Subject to any disclaimer, the term of this patent is extended or adjusted under 35 U.S.C. 154(b) by 935 days.

(21) Appl. No.: 13/138,207

(22) PCT Filed: Jan. 22, 2010
(Under 37 CFR 1.47)

(86) PCT No.: PCT/EP2010/050718
§ 371 (c)(1),
(2), (4) Date: Mar. 1, 2012

(87) PCT Pub. No.: WO2010/084168
PCT Pub. Date: Jul. 29, 2010

(65) Prior Publication Data
US 2012/0267230 A1    Oct. 25, 2012

(30) Foreign Application Priority Data

Jan. 26, 2009   (AT) .................................. A 129/2009

(51) Int. Cl.
*C02F 1/14*      (2006.01)
*B01D 1/00*      (2006.01)
(Continued)

(52) U.S. Cl.
CPC ................ *C02F 1/14* (2013.01); *B01D 1/0023* (2013.01); *B01D 1/221* (2013.01); *B01D 5/006* (2013.01);
(Continued)

(58) Field of Classification Search
CPC ........ C02F 1/048; C02F 1/14; C02F 2013/08; C02F 2201/003; C02F 2201/009; C02F 2209/02; C02F 2209/40; C02F 2209/42; B01D 1/0035; B01D 3/02; B01D 5/006; Y02E 10/40; Y02E 10/45; Y02E 10/47
USPC ............... 203/10, 100, DIG. 1; 202/167, 179, 202/185.1, 234
See application file for complete search history.

(56) References Cited

U.S. PATENT DOCUMENTS 3,257,291 A    6/1966  Gerber
3,397,117 A    8/1968  Smith et al.
(Continued)

FOREIGN PATENT DOCUMENTS

CA    2 129 600       2/1996
CN    1529678 A       9/2004
(Continued)

OTHER PUBLICATIONS

International Search Report of PCT/EP2010/050718, May 26, 2010.
(Continued)

*Primary Examiner* — In Suk Bullock
*Assistant Examiner* — Jonathan Miller
(74) *Attorney, Agent, or Firm* — Collard & Roe, P.C.

(57) ABSTRACT

A portable solar-thermal device produces fresh water from sewage water or salt water. The device has a closed fluid circuit made of connected pipe or hose elements with a sewage water supply and a fresh water runoff. The fluid circuit has a tilted heating section essentially aligned normally to the sun irradiation for heating and vaporization of the sewage water. Connected to this is an essentially vertically aligned condensation section for condensation of the fresh water and heating of the sewage water. A storage section is designed as base area for the condensed fresh water. The heating section of the fluid circuit has a solar collector for concentration of the thermal energy of sun irradiation on a vaporization area inside the heating section.

31 Claims, 6 Drawing Sheets

Figure 1:
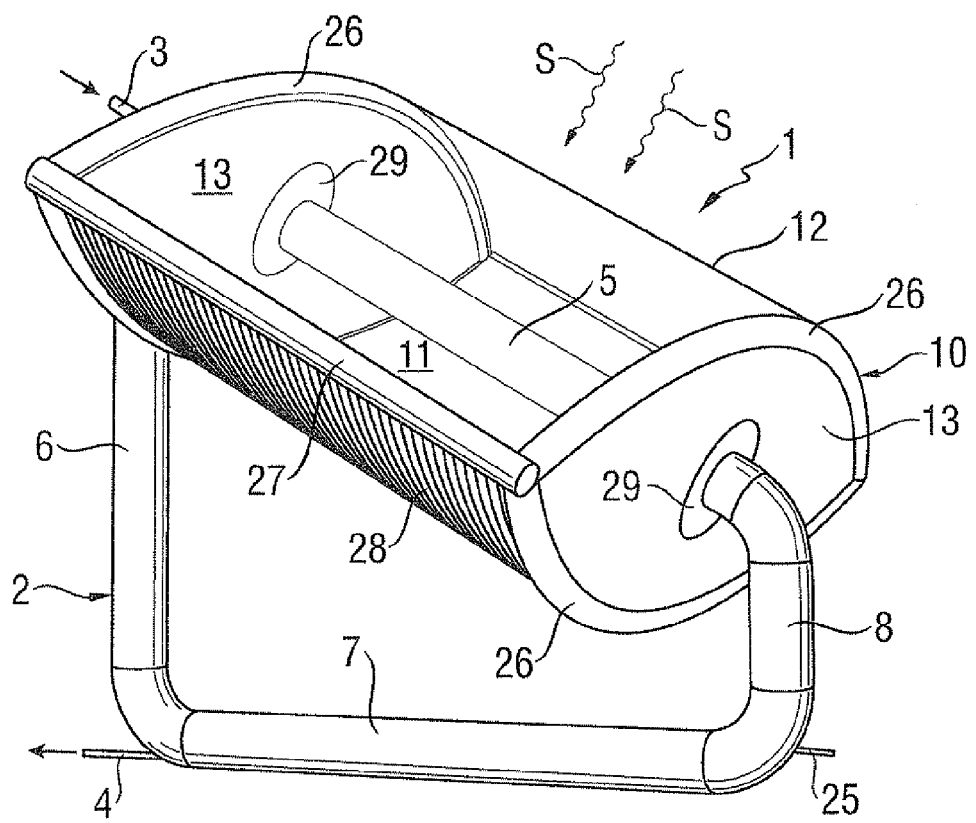

(51) Int. Cl.
  *B01D 1/22* (2006.01)
  *B01D 5/00* (2006.01)
  *C02F 1/18* (2006.01)
  *F24J 2/00* (2014.01)
  *C02F 103/08* (2006.01)

(52) U.S. Cl.
  CPC ............ *B01D 5/0039* (2013.01); *B01D 5/0087* (2013.01); *C02F 1/18* (2013.01); *F24J 2/0015* (2013.01); *C02F 2103/08* (2013.01); *C02F 2201/003* (2013.01); *C02F 2201/009* (2013.01); *C02F 2209/02* (2013.01); *C02F 2209/40* (2013.01); *C02F 2209/42* (2013.01); *C02F 2301/046* (2013.01); *Y02B 30/52* (2013.01); *Y02E 10/40* (2013.01); *Y02W 10/37* (2015.05)

(56) References Cited

U.S. PATENT DOCUMENTS

| | | | |
|---|---|---|---|
| 3,875,926 A | | 4/1975 | Frank |
| 4,051,834 A | | 10/1977 | Fletcher et al. |
| 4,151,830 A | * | 5/1979 | Crombie et al. ............ 126/624 |
| 4,210,121 A | | 7/1980 | Stark |
| 4,210,494 A | | 7/1980 | Rhodes |
| 4,312,709 A | | 1/1982 | Stark et al. |
| 4,325,788 A | * | 4/1982 | Snyder .......................... 202/234 |
| 4,432,342 A | | 2/1984 | Lucas et al. |
| 4,469,938 A | | 9/1984 | Cohen |
| 4,487,659 A | | 12/1984 | Stark |
| 4,504,362 A | | 3/1985 | Kruse |
| 4,680,090 A | | 7/1987 | Lew |
| 5,628,879 A | * | 5/1997 | Woodruff ...................... 202/234 |
| 6,165,326 A | * | 12/2000 | Markopulos .................. 202/234 |
| 6,391,162 B1 | * | 5/2002 | Kamiya et al. .................. 203/11 |
| 7,534,327 B2 | | 5/2009 | Augustin |
| 2003/0150704 A1 | * | 8/2003 | Posada ............................. 203/1 |
| 2006/0016682 A1 | * | 1/2006 | Lin .............................. 202/234 |
| 2007/0193870 A1 | * | 8/2007 | Prueitt .......................... 202/176 |
| 2008/0073198 A1 | | 3/2008 | Simon |
| 2008/0127967 A1 | | 6/2008 | Kimura et al. |
| 2011/0070635 A1 | * | 3/2011 | King et al. ................. 435/292.1 |
| 2011/0174605 A1 | * | 7/2011 | Ugolin ........................... 203/10 |

FOREIGN PATENT DOCUMENTS

| | | |
|---|---|---|
| DE | 198 15 541 | 12/1999 |
| EP | 0 030 193 | 6/1981 |
| EP | 0 345 236 | 12/1989 |
| EP | 1 448 481 | 8/2004 |
| EP | 1 598 314 | 11/2005 |
| GB | 832 123 | 4/1960 |
| JP | 62-136287 | 6/1987 |
| WO | WO 03/008338 | 1/2003 |

OTHER PUBLICATIONS

Eurasian Examination Report dated Oct. 24, 2013 in 201101120 (PCT/EP2010/050718) with German and English translation.
Taiwanese Examination Report dated Sep. 26, 2014 in Taiwanese Application No. 10321345560.

\* cited by examiner

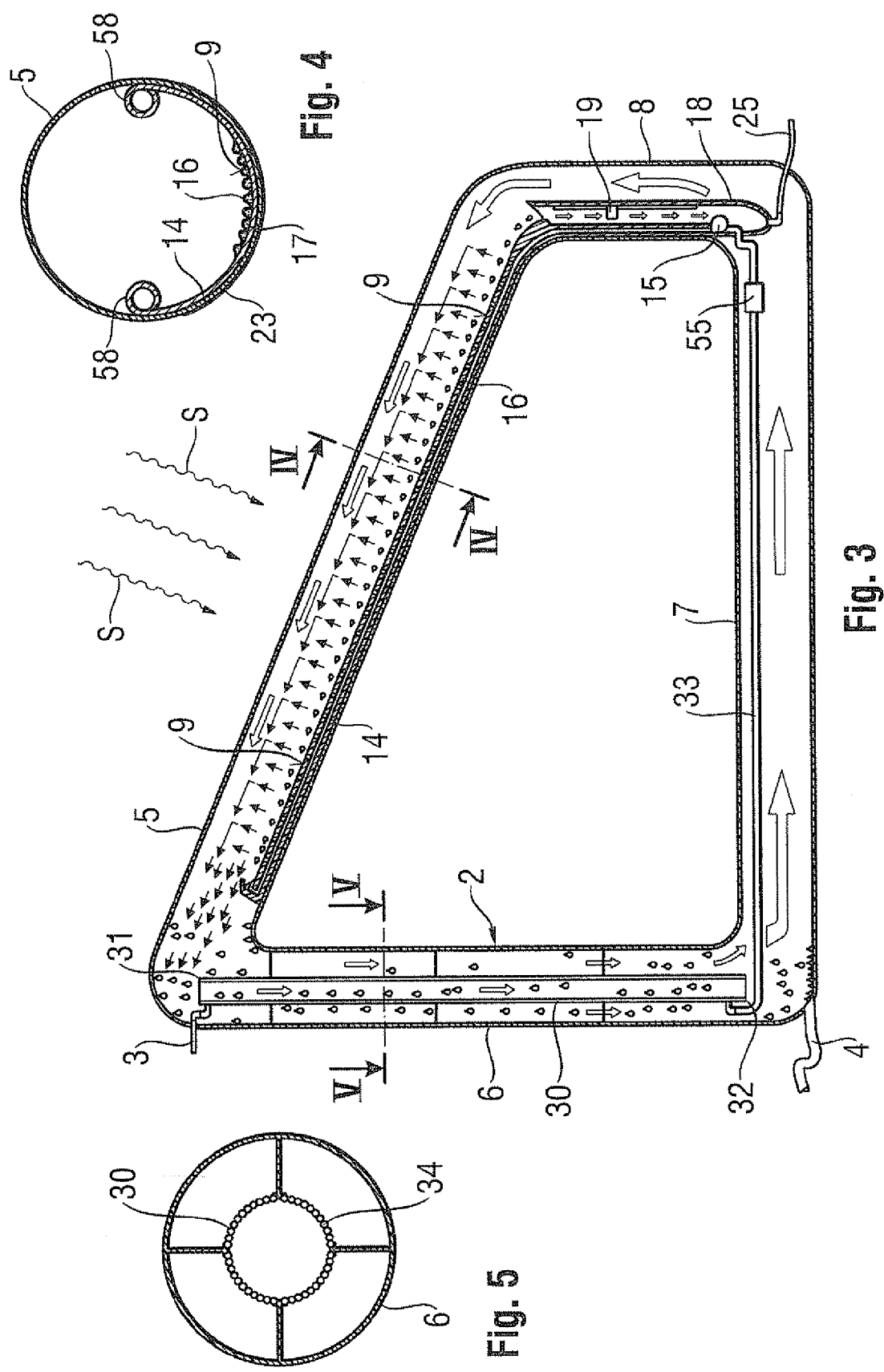

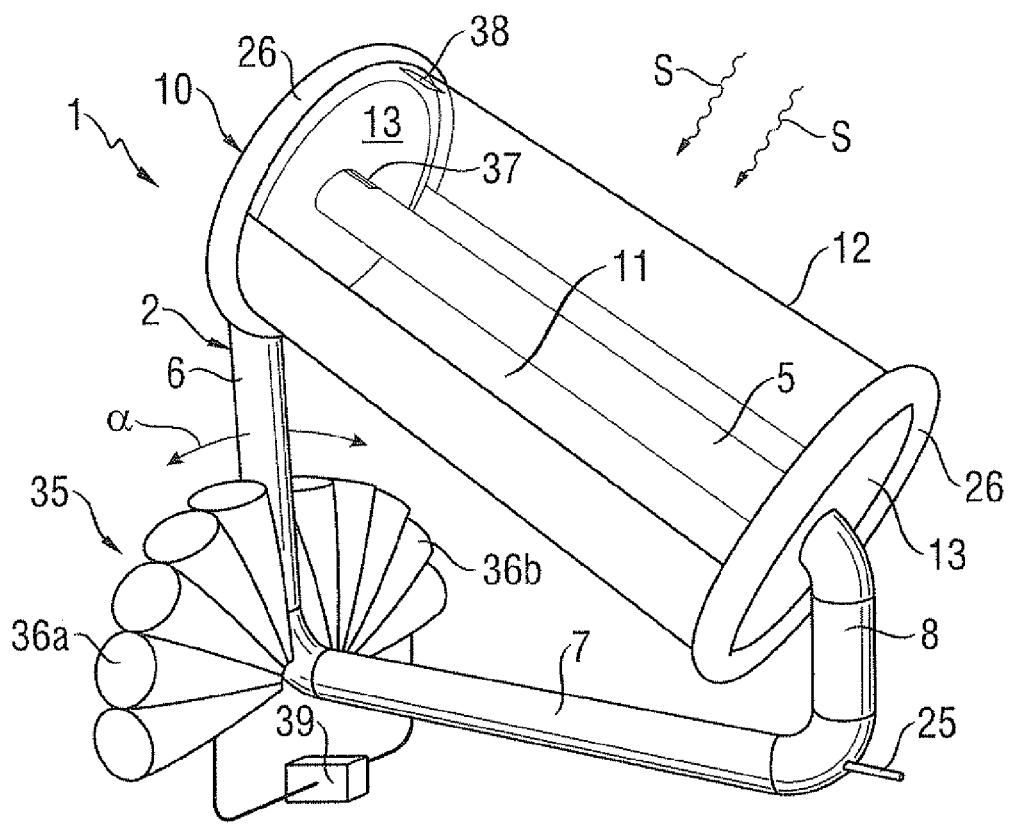
Fig. 8
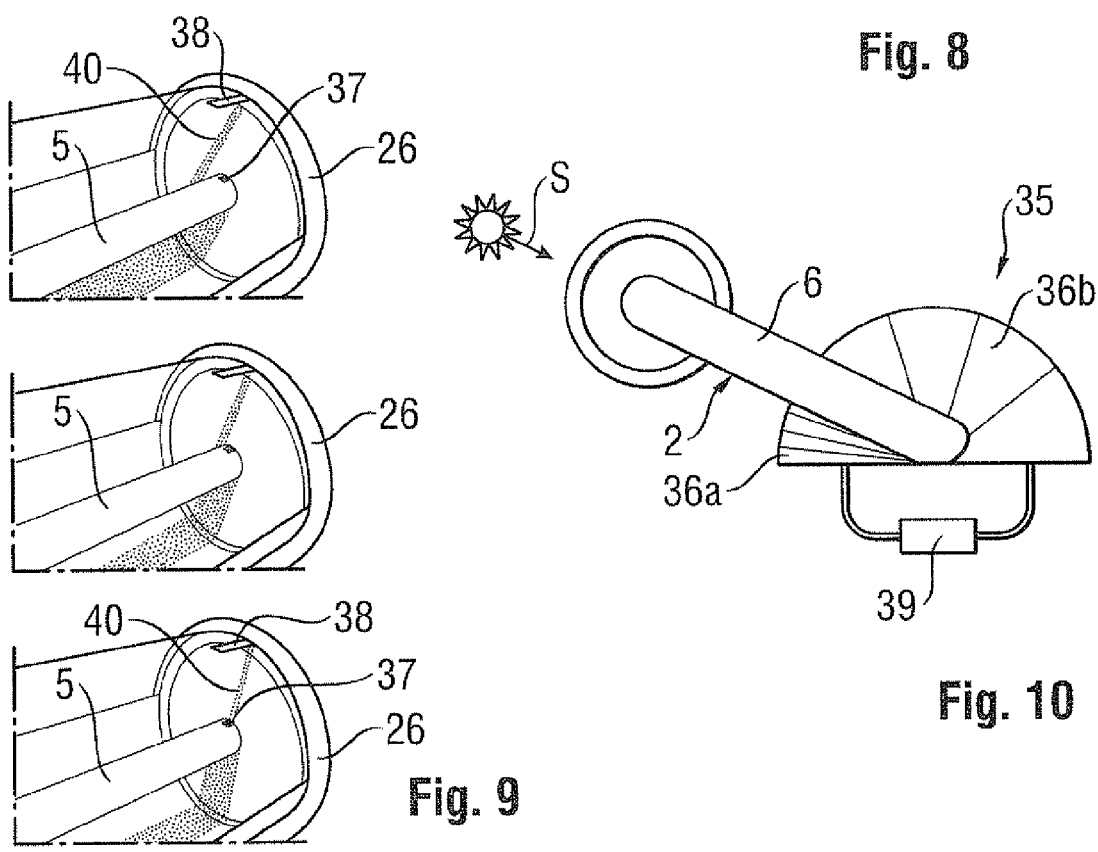
Fig. 9
Fig. 10

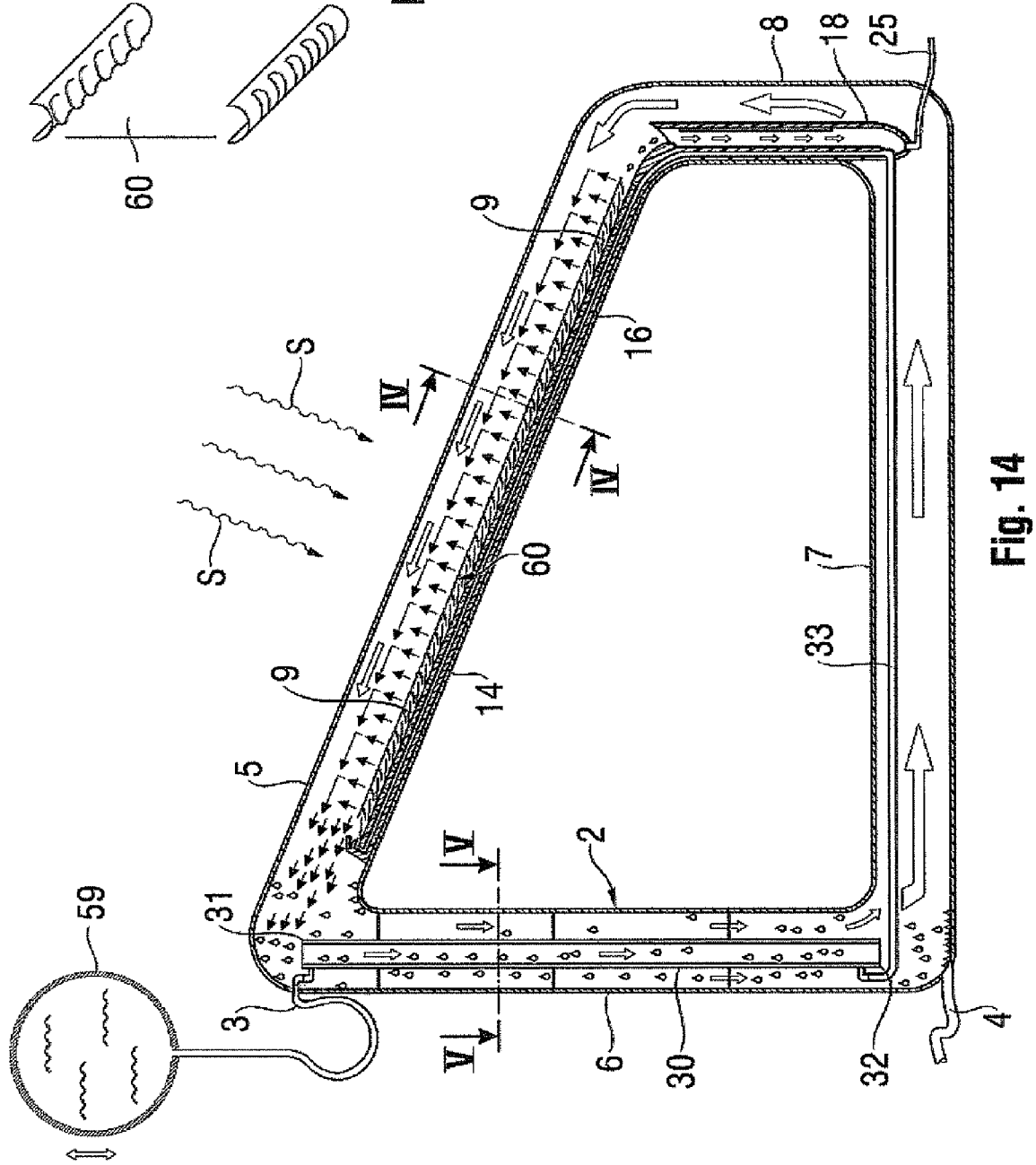

SOLAR THERMAL DEVICE FOR PRODUCING FRESH WATER

CROSS REFERENCE TO RELATED APPLICATIONS

This application is the National Stage of PCT/EP2010/050718 filed on Jan. 22, 2010, which claims priority under 35 U.S.C. §119 of Austrian Application No. A 129/2009 filed on Jan. 26, 2009, the disclosure of which is incorporated by reference. The international application under PCT article 21(2) was not published in English.

The invention concerns a portable solar-thermal device for producing fresh water from waste water or salt water.

Such devices are required to clean contaminated water, for example to produce drinking water from waste water but also to produce fresh water from salt water. A portable distillation device, for example, is known from DE 198 15 541 C1, where a pipe-shaped pressure chamber is installed between a dome-shaped upper foil and an area to take up the salt water, which is made in one piece with the upper foil, separating the supply area for salt water from the vaporisation area spatially and stabilising the complete device mechanically. Overpressure is applied to the vaporisation and condensation chamber, through the transparent upper foil of which sunlight enters. When the distillation device is operated, the water in the storage area is vaporised through heat applied form the outside. The resulting vapour rises and condensates at the upper foil, and the condensate flows down to the left and right, where it is collected in a condensation area situated between the upper foil and the pipe-shaped chambers. From these areas, the fresh water can be taken through a runoff.

In this connection, a floatable distillation device is known from GB 832 123, which has a transparent outer cover that is folded open with a network of inflatable support pipes. The forming distillate is collected in a ring-shaped chamber in the device's base area and can be removed with a hose.

Furthermore, a device for potable water production that can be used on land and on sea is known from EP 1 448 481 B1. The device consists of a cap-shaped self-bearing formed part made of transparent plastics that has an open floor area with a run-off for the condensate at the side in the lower area. For removal of the condensate, there is an opening at the top so that the device must be turned on its head for emptying.

The task of the invention is improving a portable, solar-thermal device for the production of fresh water from sewage or salt water of the type named initially so that it can be manufactured easily and used quickly where required. It should also be possible to store the device without requiring a lot of space.

This task is solved by a device with the following features:
A closed fluid circuit from pipe and hose elements connected to each other with a sewage supply and fresh water runoff,
with the fluid circuit being characterised by a tilted heating section mainly aligned normally to the sun irradiation for heating and vaporising the sewage water, followed by
a mainly vertically aligned condensation section for condensation or fresh water and heating of the sewage water, and
a storage section as base part for the condensed fresh water.

In contrast to the state of the art devices, the closed fluid circuit from the connected pipe or hose elements has a space-saving flat structure (triangular or trapezoid) in the tilted heating section of which a solar collector is preferably installed for concentrating the thermal solar irradiation energy on a vaporisation area inside the heating section, with the collector being firmly or movably connected to the heating section.

Pursuant to a first advantageous version of the design, the solar collector consists of an inflatable foil structure characterised by a parabolic or circular-cylindrical reflective foil and transparent entry foil for sun irradiation, which, together with two side parts, span a hollow space that is penetrated by the heating section of the fluid circuit in the focal area of the reflective foil.

While from U.S. Pat. No. 4,051,834 solar collector systems are known in which the collector is made of an upper area transparent for sun irradiation and a reflecting base area, these only serve for heating a heat carrier medium. The reflecting base area consists of MYLAR foil coated with aluminium to focus sun irradiation on a heating pipe in which a heat carrier medium flows. Design versions are described in which the heating pipe is placed inside the collector as well as versions where the heating pipe is used as an outer support structure from which the collector is suspended movably with spacing elements. Due to the horizontal alignment of the heating pipe, there is no daily sun adjustment but only a manual seasonal adjustment to different sun positions, which is achieved with an anchoring chain. The described device, however, is not suitable for distilling fresh water from sewage water or salt water.

Furthermore, from EP 0 030 193 B1 a tube collector is known that is placed inside an inflatable structure. The inflatable structure consists of an upper transparent foil and a base foil coated reflectively on the inside. The sun irradiation is focussed on a heating pipe in which a heat carrier medium flows. With mechanical adjustment, the heating pipe is moved to the side and adjusted to the focal area changing with sun distance. This, too, is a device for heating of a heat carrier medium rather than a device for producing fresh water.

According to a second beneficial design version of the invention, the solar collector has at least one absorber wing which is in thermal contact to the vaporisation area of the heating section of the closed fluid circuit. Preferably, two absorber wings are present that can be turned of folded parallel to the axis of the heating section and can be folded into the space spanned by the fluid circuit from a usage position to a space-saving storage position.

The different sections of the fluid circuit according to the invention are characterised by innovative installations. A vaporisation mat made of a flexible foil material is placed inside of the tilted, rising heating section, and a transporting device, e.g. a pump driven by solar power, transports the sewage water onto the vaporisation mat.

According to the invention, the inside of the condensation section following the heating section is equipped with a heat exchanger mat made of flexible foil material preferably forming a cylinder coating, the upper edge of which is connected to the sewage water supply and the lower edge to a hose line led through the storage section of the fluid circuit, which takes the sewage water to the heating section via a transport device, preferably a pump operated by solar power. The alignment of the heat exchanger mat for the sewage water supply supports condensation of fresh water by the cooler sewage water while the sewage water is heated at the same time to increase system efficiency.

According to a particularly beneficial design version, the device according to the invention is characterised by an adjustment device for adjustment to the sun position, which affects the fluid circuit, preferably at the condensation section, to cause a tilting motion of the complete device. This very simple but effective adjustment device has only few components and is characterised by inflatable or form elements connected to a pump, the fill level of which determines the inclination of the complete device. The details and function of this innovative adjustment device are explained in more detail below in FIG. 8 to FIG. 10.

According to another alternative design version of the invention, the solar collector is characterised by an adjustment device for adjustment to the sun position, which causes a rotary movement of the collector around the heating section axis. In contrast to the adjustment device described above, the collector is here suspended movably on the heating section axis; this version also uses simple means available on the market or cheap to manufacture. Thus, the adjustment device mainly consists of first and second hose sections, the ends of which are wound in opposite directions around a pipe-shaped section of the fluid circuit, with its free ends being attached to the solar collector. The hoses contain a liquid such as water, which is only pumped from one hose section to the other to change the tension strength of the wound-up end, causing a rotary movement of the solar collector. As in the adjustment device named first with the formed elements that can be folded open, one pump can also be used on a larger number of solar collectors with this adjustment device, so that the expenses for solar adjustment is minimised.

For the design version of the invention that has a solar collector with absorber wings, an adjustment device is not intended. According to the invention, the absorber wings can be attached to a base part that has a receptacle area adjusted to the heating section.

According to the invention, the absorber wings may have ducts for the transport of a heat carrier medium which end in connection lines that are guided through the basis part of the solar collector. The absorber wings may consist of a foil composite with several layers, forming an inflatable support mat with air ducts and an absorber mat with ducts for a heat carrier medium.

Figure 2:
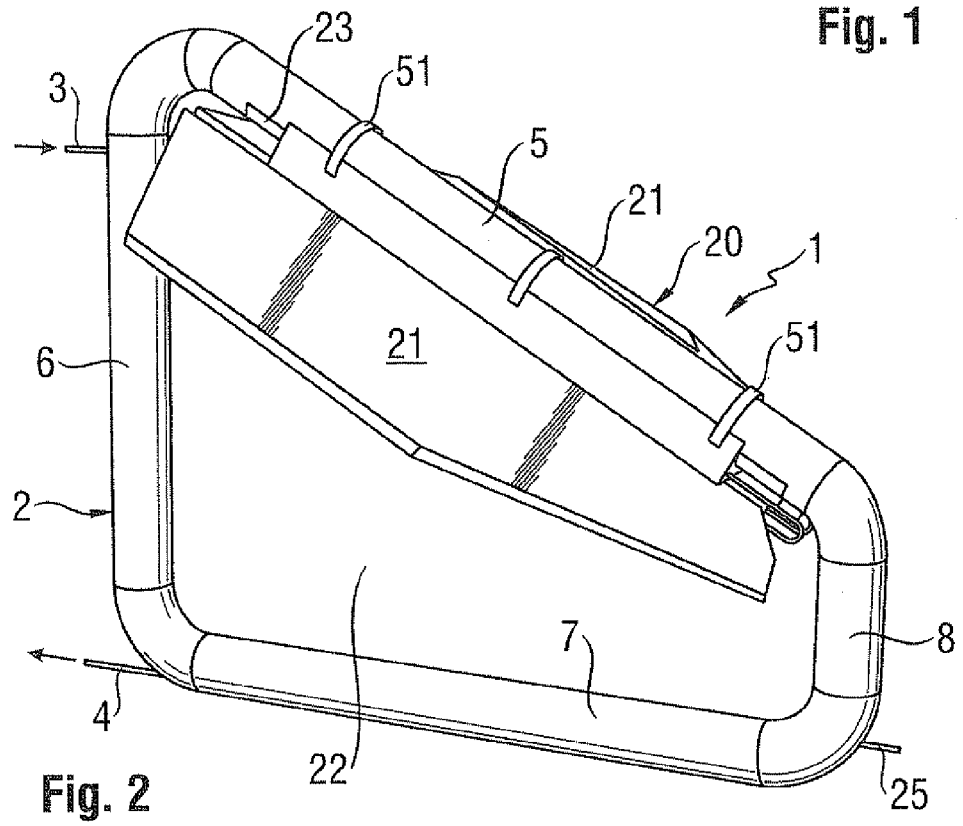
Figure 6:
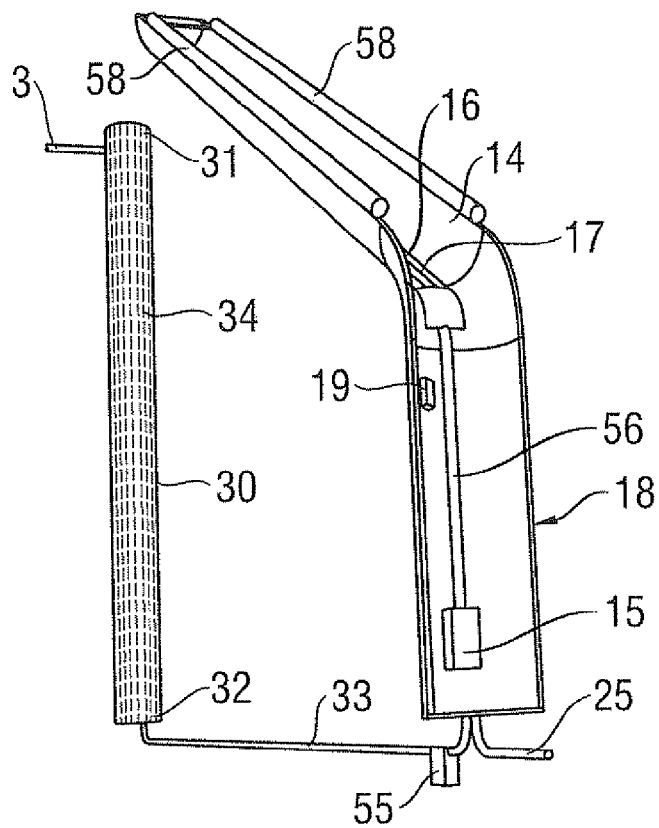
Figure 7:
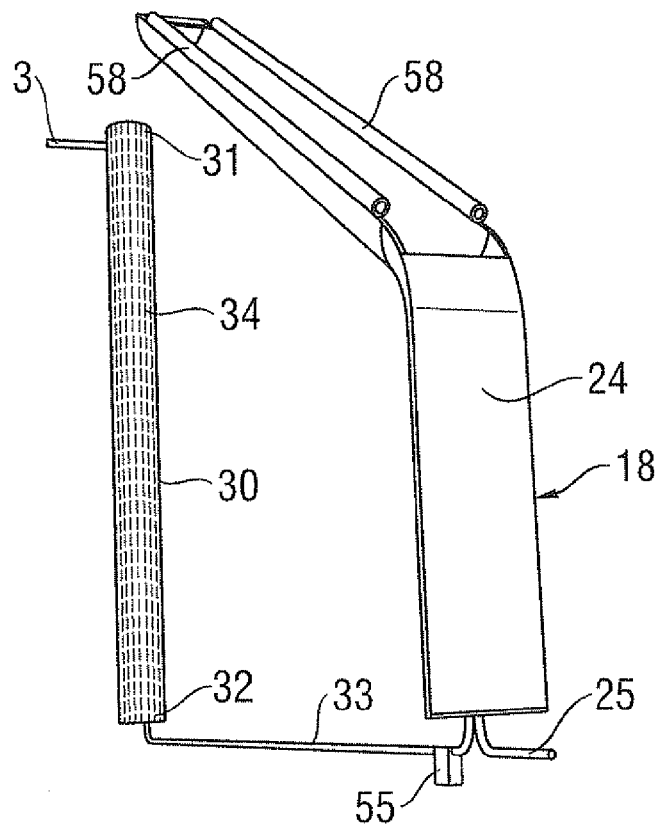
Figure 11:
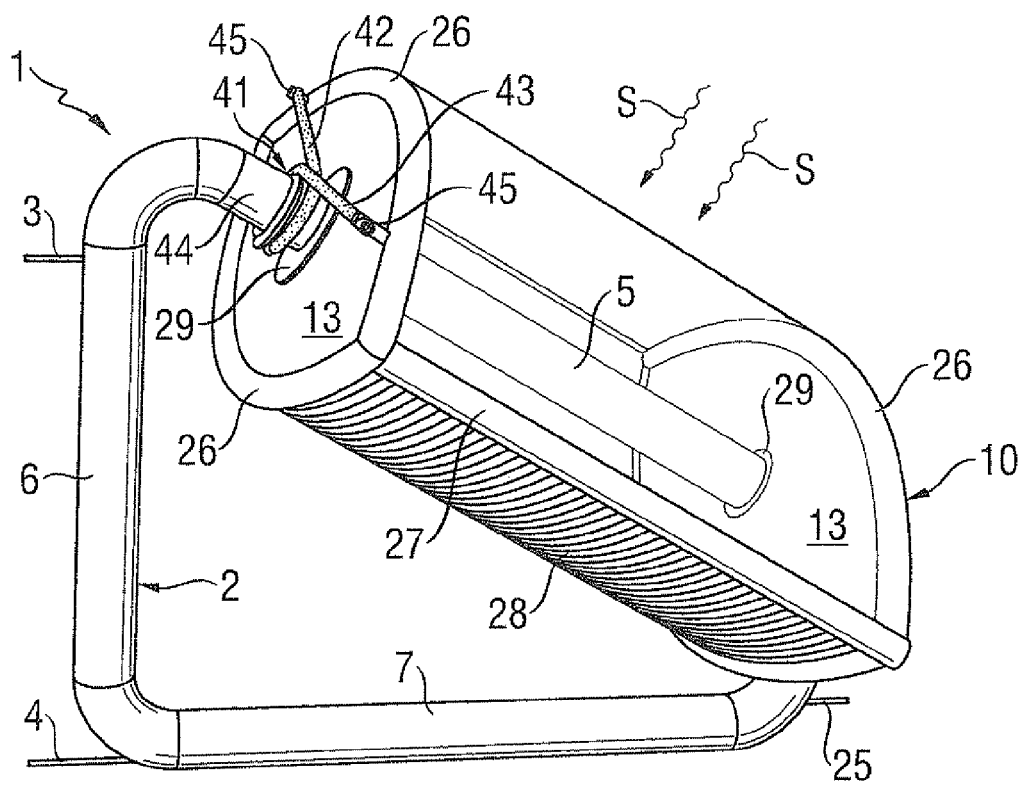
Figure 12:
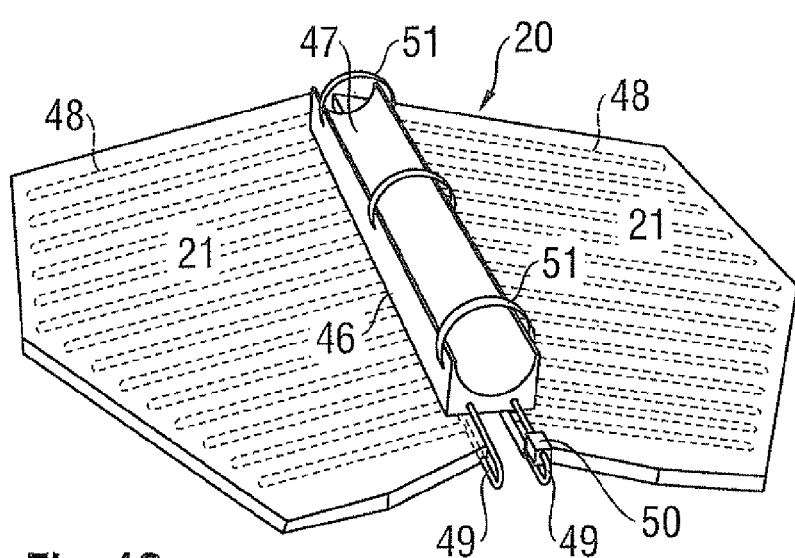
Figure 13:
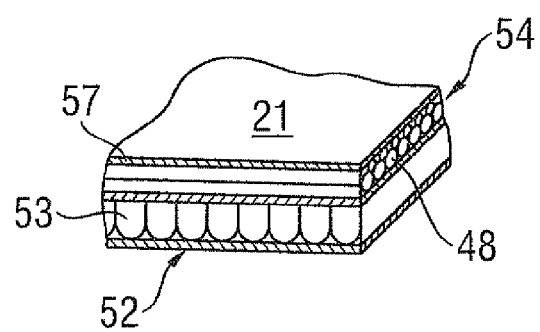

The invention is in the following explained in more detail using drawings. These are:

FIG. 1 a solar-thermal device for production of fresh water from sewage water or salt water according to the invention in a three-dimensional illustration;

FIG. 2 a design version of the device according to the invention in a three-dimensional illustration, FIG. 3 the functional principle of the device according to the invention in a schematic section;

FIG. 4 a section pursuant to line IV-IV in FIG. 3;

FIG. 5 a section pursuant to line V-V in FIG. 3;

FIG. 6 and FIG. 7 details of the installations in the fluid circuit of the device according to the invention;

FIG. 8 another design version of the device according to the invention in a three-dimensional illustration;

FIG. 9 and FIG. 10 details of the device pursuant to FIG. 8 in connection with solar adjustment;

FIG. 11 another design version according to the invention in a three-dimensional illustration;

FIG. 12 the solar collector of the design version pursuant to FIG. 2 in a detail illustration;

FIG. 13 a detail of the solar collector pursuant to FIG. 12;

FIG. 14 the functional principle of a design version in a schematic section; and FIG. 15 a detail of the version pursuant to FIG. 14.

The first design version of the portable, solar-thermal device 1 for production of fresh water from sewage water or salt water including functional principle is illustrated in FIG. 1 and FIG. 3 to FIG. 7. Device 1 consists of a fluid circuit 2 mainly closed except for the sewage water supply 3 and fresh water runoff 4, made of connected pipe elements (preferably PVC hard-plastic tubes) or of hose elements made of textile-reinforced foil material, which are inflated for operation of the system. The fluid circuit 2 is characterised by a tilted, rising heating section 5 essentially aligned normally to the sun irradiation S, which serves heating and vaporisation of the supplied sewage water or salt water.

The heating section is essentially followed by a vertical condensation section 6, in which the water vaporised in the heating section 5 condensates, with condensation heat being transferred to the supplied sewage water. Furthermore. fluid circuit 2 is characterised by a storage section 7 for condensed fresh water that is built as base section, which is connected to the heating section 5 through a connecting section 8. The base area of device 1 can be characterised by support elements not indicated here, which support the solar-thermal device at the place of setup or there may be a receptacle into which the lower part of fluid circuit 2 is inserted.

Fluid circuit 2 can simply be plugged together from standard PVC pipes, with the respective elbow pieces with the required angles being inserted at the corner. Deviating from this, alternative structures such as pipes with oval cross-section or several parallel pipes are also possible.

A solar collector 10 is attached rotatable at heating section 5 of fluid circuit 2; it is used for concentrating the thermal energy of sun irradiation S on a vaporisation area 9 (see, e.g., FIG. 3 and FIG. 4) inside heating section 5.

In the design version pursuant to FIG. 1, the solar collector 10 essentially consists of an inflatable foil structure characterised by a parabolic reflective foil 11 and a transparent entry foil 12 on the opposite side for sun irradiation S. A hollow space is thus created between the two side elements 13, which is penetrated by heating section 5 of fluid circuit 2 in the focal area of the reflective foil 11.

The side elements 13 are characterised by inflatable frame parts 26 of textile-reinforced foil material, which span the parabolic shape of mirror area 11 when inflated. The parabolic form is also supported by having reflective foil 11 attached on its inside on a preferably multi-layered inflatable support foil 28, which is cut so that a parabolic form results when it is inflated. Further support elements are inflatable connection elements 27 made of textile-reinforced foil material, which connect the inflatable frame parts 26 of the side elements 13. the inner hollow spaces of the frame parts 26 and connection elements 27 as well as the inflatable support foil 28 are connected to each other so that the complete structure can be inflated using an inlet valve.

The side elements 13 of solar collector 10 have bearing discs 29, for example made of hard-plastic, integrated; on them, the complete solar collector 10 is attached rotable to the heating section 5 of the pipe-shaped fluid circuit 2. The complete device can be produced almost exclusively of plastics, with only the bearing parts being made of textile-reinforced plastics foil or PVC plastics pipes. Therefore, a small packing unit is possible, which makes the device well suitable for quick mobile use.

The functional principle of the device is shown in detail in FIG. 3 to FIG. 5. Sewage water moves through the sewage water supply 3 to condensation section 6 of fluid circuit 2, where it flows through a heat exchanger mat 30 rolled up to form a pipe-shaped cylinder coating made of flexible foil material, the upper edge 31 of which is connected to the sewage water supply 3. In this area, the sewage is heated by the condensing fresh water. The lower edge 32 of the heat exchanger mat 30 is connected to a hose line 33 guided through storage section 7 of fluid circuit 2, which takes the sewage water to a sewage water pocket 18 placed in the connecting section 8 of fluid circuit 2. Using a solar pump 15, the sewage water is transported from the sewage water pocket 18 to heating section 5.

Inside heating section 5 a vaporisation mat 14 is placed (suspended or glued), consisting of flexible foil material, the surface of which forms vaporisation area 9 together with a glued- or welded-on heating pocket 16 (see FIG. 4). Heating pocket 16 is formed by a glued- or welded-on foil strip, with transport ducts 17 for sewage water pumped up from the sewage water pocket 18 being present between the vaporisation mat 14 and the heating pocket 16.

The sewage water pocket 18 may also consist of flexible foil material, with the non-vaporised sewage water flowing back from heating section 5 being collected in it and returned to heating section 5 by the pump. The solar pump 15 for sewage water is placed in the sewage water pocket 18 together with a water level meter 19 and may form a replaceable unit with it. When the water level meter 19 detects a drop of the water level in the sewage water pocket 18, a control valve 55 in hose line 33 is opened, so that sewage water can automatically flow in up to a level defined by water level meter 19.

This way, the device according to the invention includes a closed fluid circuit 2 with a water circuit and an air circuit, which is driven by the upwards inclined heating section 5 (rising hot air) as well as by the vertically dropping condensation section 6 (falling cooled air) and actively moves the vapour produced in the heating into the condensation section.

The condensed fresh water or potable water collects in the storage section 7 and can be removed from the system by the fresh water runoff 4. Through the continued water circuit in the heating area, the sewage water or salt water is concentrated and must be removed from sewage water pocket 18 through water runoff 25 from time to time, e.g. once per day. Preferably sewage water pocket 18 can be made from a section of vaporisation mat 14 by folding and/or gluing, so that the complete unit of vaporisation mat 14, heating pocket 16 and sewage water pocket 18 can be replaced.

The installations of fluid circuit 2 according to the invention are shown as an overview in FIG. 6 and FIG. 7, with the cover 24 of sewage water pocket 18 being removed in FIG. 6 for better view, so that the installations of sewage water pocket 18, as well as transportation means 15, connection line 56 to the transport ducts 17 and the water level meter 19 can be seen. The electrical lines between the water level meter 19 and control valve 55 and solar pump 15 are not indicated. The solar pump 15 has an output of approx. 15 W to 25 W and is connected to a solar panel not indicated here.

On both side edges of the vaporisation mat 14 there are stabilising bulges 58 (also see FIG. 4), which stabilise the vaporisation mat 14 and guide water condensing on the inner wall of heating section 5 around the sewage water pocket 18 and to storage section 7.

The heat exchanger mat 30 can be cheaply made of PVC soft foil. It consists of two foil strips that are welded together so that ducts 34 appear in longitudinal direction. The mat is then rolled and glued at the ends to form a pipe (see FIG. 5) held in the centre of condensation section 6 by spacer elements. Since the heat exchanger mat 30 is cooler than its environment, condensing of vapour is initiated. The cooler air now drops in the pipe so that the circuit is driven forward. The heat energy released at condensing is taken up by the sewage water in heat exchanger mat 30. It was proven that this enables energy recovery of up to 80%. Since the sewage water supply 3 is at the highest point of the system, sewage water supply requires no pump.

The design version of the device according to the invention shown in FIG. 8 differs from that pursuant to FIG. 1 by a particularly simple solar collector 10 with circular side elements 13 glued or welded firmly to heating section 5 of the pipe-shaped fluid circuit 2. In this design version, an adjustment device 35 is implemented for balancing the sun position, which can trigger a tilting movement of the complete device 1. For this, the adjustment device directly affects the fluid circuit 2, e.g. at condensation section 6; it is designed very simply constructively and mainly consists of two inflatable form elements 36*a*, 36*b* that can be unfolded and are connected through a pump 39. Using the pump 39, for example water is pumped from one form element 36*a* to the other form element 36*b*, with the respective fill level of form elements 36*a*, 36*b* determining the inclination α of device 1. The form elements 36*a*, 36*b* can, for example, consist of several divided wedges. FIG. 10 for example shows one of the extreme positions of condensation section 6 (e.g. in case of low sun position in the morning), in which form element 36*a* is almost completely empty and form element 36*b* filled to the maximum.

The pump 39 between the two form elements 36*a* and 36*b* is controlled through a control device characterised by a light sensor 37 attached to heating section 5 and a shadow caster 38 placed on the transparent entry foil 12. As shown in the illustration sequence pursuant to FIG. 9, the shadow 40 of the shadow caster 38 first does not fall on sensor 37, so that the pump is switched on and the device aligns itself to the sun position. The shadow 40 moves and finally falls on the light sensor 37, so that the pump 39 is switched off. When the sun moves on, this procedure is repeated until dusk at night, only the water from form element 36*a* must be pumped to form element 36*b* to bring the system back into the initial position for sunrise.

FIG. 11 shows another beneficial adjustment device 41 for adjusting to the sun position, which causes a rotary movement of the collector 10 around the axis of heating section 5. For this, the adjustment device 41 has first and second hose sections 42, 43, the ends of which are wound around the pipe-shaped section 44 of fluid circuit 2 once to the right and once to the left. The outer free ends 45 of the two hose sections 42, 43 are each attached to the outer contour of the solar collector 10. According to the adjustment system pursuant to FIG. 8, a pump (not illustrated) now controls the pressure in one of the two hose sections 42, 43, which triggers a rotary motion of the collector. Here, too, the hose sections 42, 43 can be made of textile-reinforced foil material and several devices pursuant to FIG. 11 can be connected to a component.

In the design version according to the invention pursuant to FIG. 2, the solar collector 20 has two absorber wings 21 that are thermally connected to vaporisation area 9 of heating section 5. the two absorber wings 21 can be rotatable or foldable parallel to the axis of heating section 5 and be folded from the usage position shown in FIG. 2 into a space-saving storage position by folding them into the space 22 spanned by fluid circuit 2. The solar collector 20 can be attached to the heating section 5 of the fluid circuit for example with fastening elements 51 (e.g. fastening belts).

Several beneficial details of the solar collector 20 are indicated in FIG. 12. the absorber wings 21 are attached to a basis part 46 that is characterised by a receptacle surface 47 adjusted to heating section 5. For improvement of the heat transfer, in particular this design version has a heat-conducting foil 23 at the outer sides of heating section 5, preferably copper foil. The heat transfer can be improved additionally by application of a heat-conductive paste between the receptacle surface 47 and copper foil 23.

Preferably, the absorber wings 21 are equipped with ducts 48 for transporting a heat carrier medium (e.g. oil or water), and these ducts 48 lead to connection lines 49 that are led through the basis part 46 of the solar collector 20. in working position, the two absorber wings 21—as illustrated in FIG. 2—are tilted so that the heated heat carrier medium rises in the direction of the basis part 46. Heat transport can be additionally supported by a transportation means 50, e.g. a solar pump placed in at least one of the two connection lines 49.

As indicated in the detailed drawing pursuant to FIG. 13, the absorber wing 21 may consist of a multi-layered foil composite with an inflatable support mat 52 with air ducts 53 being intended to carry an absorber mat 54 with ducts 48 for the heat carrier medium. To minimise heat loss, the outer surface of the absorber mat 54 may also be equipped with an isolating foil 57.

Another alternative is shown in FIG. 14 and FIG. 15 with a design version of the invention that takes the salt or sewage water to heating section 5 without the control valve 55 and pump 15 of the version described initially. The sewage water is in this case transported only by the hydrostatic pressure due to the height difference between the supply container 59 placed above the sewage water supply 3 and the exit point of the sewage water at the upper end of heating section 5.

In another version, the vaporisation area 9 can be enlarged by placing or welding two half pipes 60 bent differently or equipped with a different radial bend, for example made of metal, close above each other above the transport ducts 17 of the heating pocket 16. The area of the upper half pipe is cut open in a semi circle at regular intervals and bend downwards, and the area of the lower half pipe is cut open in a semi circle at regular intervals and bent upwards, with both half-pipes interlocking (see FIG. 15) so that the heated water does not directly flow through heating section 5, but in a zigzag course and the non-vaporised remaining water flows into the sewage water pocket 18 at the end and from there can be removed directly through sewage water run-off 25.

Furthermore, for better heat transfer, the half pipes 60 may be directly connected to the heat-conductive foil 23 of heating section 5. it is also possible to manufacture the complete lower section of the heating section between the metal half-pipes 60 and heat-conductive foil 23 from metal.

The sewage water flow rate may be measured at the sewage water runoff 25 and at the sewage water (salt water) infeed 3 by flow meters and thus the flow rate and percentage of vaporised water can be controlled by adjusting the height of the supply container 59 and thus by adjusting the hydrostatic pressure.

As another version, the temperature in the heating area of heating section 5 may be controlled by a change of the bend of the reflective foil 11; in this case, the foil preferably consists of a reflective of polished thin metal plate (e.g. aluminium).

The solar collector 10 pursuant to FIG. 1 may be changed in so far as the inflatable connection element 27 may be a stiff tube and the frame parts 26 be designed as a ring hose. These parts may also be filled with water form the supply tank, with the ring hose 26 either being filled with water to the complete circle (e.g. as in FIG. 8) or the reflective surface being brought from a half-circle to an increasingly flatter shape by drawing of water and lowering the tension in the ring hose 26. Mirror control may also be controlled by a thermostat (not illustrated) in the heating area. It activates a pump or drainage valve when the temperature sinks below a determined lower value or when a determined highest temperature value is exceeded to regulate the inner pressure and thus the bend of the reflective surface.

The invention claimed is:

1. A portable solar-thermal device for production of fresh-water from sewage water or salt water, the device comprising
   a closed fluid circuit made of pipe or hose elements connected to a sewage water supply and a fresh water runoff,
   with the fluid circuit having a tilted heating section aligned mainly normally to the sun irradiation for heating and vaporization of the sewage water, followed by
   a mainly vertically aligned condensation section for condensation of the fresh water and heating of the sewage water, and
   a storage section formed as base area for the condensed fresh water,
   wherein the heating section of the fluid circuit has a solar collector for focussing the thermal energy of sun irradiation on a vaporization area inside the heating section with the collector, and
   wherein that solar collector has at least one absorber wing in thermal contact to the vaporization area of the heating section.

2. The device according to claim 1, wherein the solar collector comprises an inflatable foil structure having a parabolic or circular cylindrical reflective foil and a transparent entry foil for sun irradiation that together with two side elements span a hollow space penetrated by the heating section of the fluid circuit in the focal area of the reflective foil.

3. The device according to claim 1, wherein two absorber wings are provided that can be rotated or folded parallel to the axis of the heating section and that can be folded from the usage position into space saving storage position in the space opened by the fluid circuit.

4. The device according to claim 1, wherein inside the tilted heating section there is a vaporization mat comprising a flexible foil material, with a transporter being provided for transporting sewage water to the vaporization mat.

5. The device according to claim 4, wherein the vaporization mat forms a heating pocket with glued- or welded-on foil material, with transport ducts for the rising sewage water being formed between the vaporization mat and heating pocket.

6. The device according to claim 4, wherein an essentially vertical connecting section of the closed fluid circuit is placed between the storage section and the heating section, which receives a sewage water pocket made of flexible foil material, which takes up the sewage water flowing back from the heating section.

7. The device according to claim 6, wherein the sewage water pocket is made from one piece, from a section of the vaporization mat.

8. The device according to claim 4, wherein the transporter for sewage water and a water level meter are located in the sewage water pocket, and wherein the transporter and the water level meter form a replaceable unit.

9. The device according to claim 1, wherein inside the condensation section there is a heat exchanger mat made of flexible foil material, the upper edge of which is connected to the sewage water supply and the lower edge of which is connected to hose line led through the storage section of the fluid circuit, which transports the sewage water through a transporter, into the heating section.

10. The device according to claim 9, wherein the heat exchanger mat comprises two welded or glued-together foil strips forming a multitude of parallel ducts.

11. The device according to claim 1, wherein for improvement of the heat transfer at the outside of the heating section there is a heat-conductive foil.

12. The device according to claim 1, wherein the solar collector has an adjustment device for adjusting to sun position which triggers a rotating movement of the collector around the heating section axis.

13. The device according to claim 12, wherein the adjustment device comprises first and second hose sections, the ends of which are wound around a pipe-shaped section of the fluid circuit in opposite directions and the free ends of which are attached to the solar collector.

14. The device according to claim 1, wherein the at least one absorber wing is attached to a basis part that has a receptacle surface receiving the heating section.

15. The device according to claim 14, wherein the at least one absorber wing comprises ducts for transporting a heat carrier medium, and wherein these ducts are connected to connection lines that are led through the basis part of the solar collector.

16. The device according to claim 15, wherein at least one connection line has a transporter.

17. The device according to claim 14, wherein the at least one absorber wing comprises a multi-layer foil composite that forms an inflatable support mat with air ducts and an absorber mat with ducts for the heat carrier medium.

18. The device according to claim 17, wherein an isolating foil is attached to the outer surface of the absorber mat.

19. The device according to claim 1, wherein a supply container is connected to the sewage water supply, and wherein the transport of sewage water is essentially only performed by the hydrostatic pressure due to the height difference between the supply container and the exit site of the sewage water at the upper end of the heating section.

20. The device according to claim 1, wherein the vaporization area in the heating section is enlarged by two half pipes with different radial bend, which are placed close above each other above a heating pocket of the vaporization area.

21. The device according to claim 20, wherein the surfaces of the half pipes are cut open in a half circle at regular intervals and bent towards each other.

22. The device according to claim 20, wherein the half pipes are directly connected to a heat-conducting foil of the heating section.

23. A portable solar-thermal device for production of fresh water from sewage water or salt water, the device comprising
a closed fluid circuit made of pipe or hose elements connected to a sewage water supply and a fresh water runoff, with the fluid circuit having a tilted heating section aligned mainly normally to the sun irradiation for heating and vaporization of the sewage water, followed by
a mainly vertically aligned condensation section for condensation of the fresh water and heating of the sewage water, and
a storage section formed as base area for the condensed fresh water,
wherein the heating section of the fluid circuit has a solar collector for focussing the thermal energy of sun irradiation on a vaporization area inside the heating section with the collector,
wherein the solar collector comprises an inflatable foil structure having a parabolic or circular cylindrical reflective foil and a transparent entry foil for sun irradiation that together with two side elements span a hollow space penetrated by the heating section of the fluid circuit in the focal area of the reflective foil, and
wherein the solar collector has inflatable frame parts made of textile-reinforced foil material at the side elements which open the parabolic or circular shape of the reflective surface in the inflated state.

24. The device according to claim 23, wherein the inflatable frame parts of the side elements are connected by inflatable connection elements of textile-reinforced foil material.

25. The device according to claim 23, wherein the reflective foil is attached to a multi-layer inflatable support foil.

26. The device according to claim 23, wherein the side elements of the solar collector have bearing discs with which the solar collector is attached rotatably to the heating section of the pipe-shaped fluid circuit.

27. The device according to claim 23, wherein the side elements of the solar collector are attached firmly to the heating section of the pipe-shaped fluid circuit by gluing or welding.

28. The device according to claim 27, wherein the solar collector has an adjustment device for adjusting to sun position, which affects the fluid circuit, and triggers a tilting movement of the complete device.

29. The device according to claim 28, wherein the adjustment device has form elements that can be folded open and are connected via a pump, the respective fill level of which determines the inclination level of the device.

30. The device according to claim 28, wherein the adjustment device has a control facility with a light sensor and a shadow caster.

31. The device according to claim 23, wherein the frame parts of the solar collector are designed as a ring hose that can be filled with water, and wherein it is possible to pump the ring hose completely full and to vary the fill level to adjust the bend of the reflective surface of the solar collector.

* * * * *